United States Patent [19]

Dombroski et al.

[11] Patent Number: 4,834,218

[45] Date of Patent: May 30, 1989

[54] LUBRICATING NOZZLE APPARATUS AND METHOD

[75] Inventors: Robert M. Dombroski, McFarland; John P. Kayser, Madison, both of Wis.

[73] Assignee: Madison-Kipp Corporation, Madison, Wis.

[21] Appl. No.: 183,545

[22] Filed: Apr. 16, 1988

Related U.S. Application Data

[63] Continuation of Ser. No. 935,828, Nov. 28, 1986, abandoned.

[51] Int. Cl.⁴ .............................................. F16N 13/16

[52] U.S. Cl. .................................... 184/3.1; 184/39.1; 222/133; 239/412; 417/498

[58] Field of Search ....................... 184/3.1, 26, 29, 55, 184/1, 39.1, 15.1, 15.2, 3.2; 417/498, 399; 239/424, 290, 412; 222/133

[56] References Cited

U.S. PATENT DOCUMENTS

| | | | |
|---|---|---|---|
| 1,603,902 | 10/1926 | Burdick | 239/412 |
| 1,967,251 | 7/1934 | McFerren | 184/39.1 |
| 1,994,919 | 1/1934 | Bischot | 417/498 |
| 2,011,165 | 8/1935 | Steiner | 417/498 |
| 2,104,590 | 1/1938 | Hill | 417/498 |
| 2,237,842 | 4/1941 | Reynolds | 239/412 |
| 2,239,987 | 4/1941 | Bransen | 239/412 |
| 2,614,495 | 10/1952 | Wiene | 417/498 |
| 2,664,969 | 1/1954 | Bjerre | 184/15.1 |
| 2,667,236 | 1/1954 | Graves | 184/39.1 |
| 2,953,305 | 9/1960 | Bondurant | 239/424 |
| 3,245,621 | 4/1966 | Thomas | 239/424 |
| 3,330,541 | 7/1967 | Jackson | 239/424 |
| 3,602,434 | 8/1971 | Hruby | 239/424 |
| 3,656,693 | 4/1972 | Eckert | 239/424 |
| 3,888,420 | 6/1975 | Boelkins | 239/412 |
| 3,955,647 | 5/1976 | Tine et al. | 184/39.1 |
| 4,076,173 | 2/1978 | Taccon | 239/412 |
| 4,221,339 | 9/1980 | Yoshikawa | 239/424 |
| 4,236,674 | 12/1980 | Dixon | 239/424 |
| 4,360,132 | 11/1982 | Vilagi | 239/412 |

*Primary Examiner*—Leonard E. Smith
*Attorney, Agent, or Firm*—Marshall, O'Toole, Gerstein, Murray & Bicknell

[57] ABSTRACT

A lubricating device and method in which a lubricant shot is generated by a supply of lubricant and air, the later being activated before, during and following the dispersing of the lubricant shot. The air supply travels two paths; on leads to a piston chamber and causes a piston assembly to move which, in turn, effects lubricant dispersing; the remaining air path permits air to exit the nozzle device to mix with a direct lubricant to a desired area of lubrication.

23 Claims, 2 Drawing Sheets

LUBRICATING NOZZLE APPARATUS AND METHOD

This application is a continuation of application Ser. No. 935,828, filed Nov. 28, 1986, now abandoned.

This invention relates to a lubricating assembly and method and in particular to apparatus for lubricating the frictional area between a locomotive wheel flange and rail during operation of the locomotive.

BACKGROUND OF THE INVENTION

There are many applications which require the lubrication of surfaces to reduce friction and wear. One such application is in the railroad industry where a locomotive wheel flange contacts a rail resulting in frictional build-up of heat and wear both to the wheel and rail. Excessive frictional contact between rail and flange is undesired because the amount of lost energy can be quite appreciable especially in instances where a locomotive pulls approximately one hundred cars, each of which is subject to frictional heat build-up and wear. It has been estimated that a significant savings of locomotive fuel requirements could be obtained if the energy lost due to the frictional engagement between rail and wheel could be reduced. It thus is highly desirable to minimize the effects of frictional engagement between the wheel flange and the rail.

One method for reducing friction and wear has been to lubricate the area between the wheel flange and rail. Several efforts have been made to apply the proper amount of lubricant at the desired location. One such system is disclosed and claimed in our pending patent application Ser. No. 785,571 filed Oct. 8, 1985 entitled "Wheel Flange and Rail Lubrication Apparatus". In the lubricating system disclosed in that application, we employ a lubricating nozzle assembly in which a nozzle is located contiguous to the zone of lubrication between the wheel flange and rail. While the lubricating system disclosed in our pending application performs satisfactorily in most instances, there are occasions where the shot of lubricant delivered to the area to be lubricated is not entirely satisfactory. It has been found that, in some instances, the lubricant does not properly lubricate the desired area because of inconsistent lubricant delivery pressure. The delivery pressure of the aforementioned system is dependent upon and essentially identical to the inlet pressure, and significant inlet pressure variations can be experienced due to temperature fluctuations in the lubricant line which supplies lubricant to the lubricating nozzle. The pressure may vary by a factor of two (2) with a 20° F. temperature change.

What is desired is to have a relatively smooth and consistent shot of lubricant delivered to a confined area of the wheel flange and rail by a lubricating system which is relatively insensitive to lubricant pressure variations at the inlet to the lubricating nozzle.

A pressure multiplying piston assembly in the lubricating nozzle regulates the lubricant delivery pressure by utilizing a readily available supply of compressed air which is maintained within a narrow pressure range and is independent of temperature variations.

SUMMARY OF THE INVENTION

The lubricating device of the present invention serves to deliver the desired shot of lubricant to the desired area of lubrication. The lubrication system of the present invention delivers lubricant from the device at approximately 20 times the air supply pressure. The air supply, which is approximately 100 psi, is activated before, during and following the dispensing of the lubricant from the nozzle device.

Briefly, the invention disclosed and claimed herein utilizes a lubricant shot generated by a supply of lubricant and air. The air is delivered to an air inlet port in the nozzle device and then travels two paths. One path directs air to an exit port where the air exits from the outlet port, which is an annular-shaped port, surrounding a lubricant exit port. The air exiting the nozzle device serves to mix with and direct the lubricant to the desired area of lubrication of a wheel flange or other item.

A second air path permits the air to enter a second piston chamber where the air forces a piston assembly to move in a desired direction as to cause a piston to move along the length of the longitudinal axis of a piston chamber.

Lubricant such as grease is delivered to the lubricating device at a pressure between 100 to 700 psi. The lubricant enters a nozzle inlet port which leads to a first piston chamber. The lubricant enters the piston chamber andis directed along the length of a longitudinal bore located in the piston. The piston is adapted to move in the first piston chamber to a particular location where a transverse piston bore, which connects to the longitudinal piston bore, is aligned with a nozzle bore. Upon alignment, the lubricant exits under pressure from the piston through the nozzle bore and out the nozzle tip. As the lubricant exits the nozzle tip, air simultaneously exits the annular-shaped port which surrounds the lubricant nozzle tip. The air surrounds and mixes with the lubricant to direct a shot of lubricant to a desired location on the target to be lubricated such as a wheel flange. It has been found that the nozzle assembly and lubricating method of the present invention serves to provide an improved lubricating system.

BRIEF DESCRIPTION OF THE DRAWINGS

The invention may be best understood by reference to the following detailed description taken in conjunction with the accompanying drawings in which like reference numerals identify like elements in the several figures and in which.

DETAILED DESCRIPTION

Figure 1:
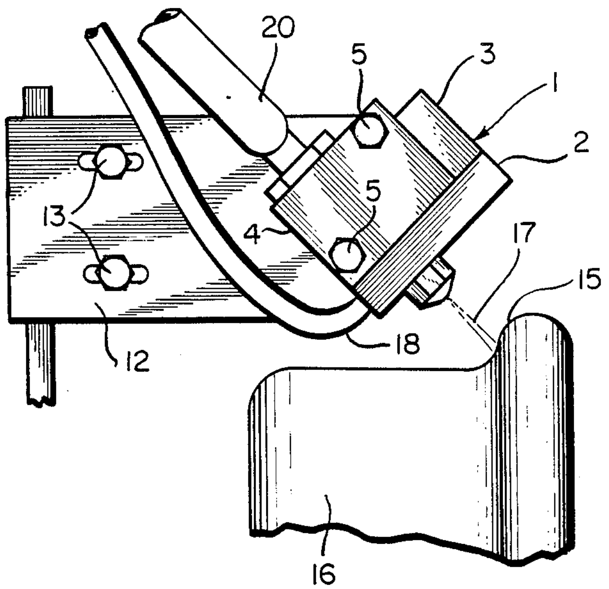
FIG. 1 shows a fragmentary perspective view of the lubricating device of the present invention disposed contiguous to a railroad car wheel to be lubricated.

Referring to the drawings and FIG. 1, lubricating device 1 comprises a first housing member 2, a housing member 3 and piston assembly member 4. Members 2 and 3 are attached to member 4 by suitable conventional screw or other fastener means, not shown. Device 1 is attached by suitable bolt means 5 to bracket 12. Bracket 12 is adjustably mounted by fasteners 13 to a railroad car, not shown. Lubricating device 1 is disposed contiguous to the flange 15 of railroad car wheel 16 where a stream of lubricating fluid 17 can be delivered, as required, to wheel flange area 15.

Air is delivered to lubricating device 1 at a pressure of approximately 100 psig through air hose 18. Lubriant is delivered to the lubricating device 1 through hose 20, the lubricant being delivered at a pressure of approximately 100 to 700 psig. Lubricant such as grease enters device 1, FIG. 2, through lubricant inlet or part 21 where the lubricant passes through filter 22. The lubricant then is delivered through port 23 into a first piston chamber 24 where the lubricant passes through a longitudinal bore 25 located in piston 26. The lubricant travels through axial bore 25 and transverse bore 27 which intersects bore 25.

Air from hose 18 enters lubricating device 1 at air inlet or port 30. The air passes around lubricant outlet nozzle 31 through reduced diameter air passageways 32 and 33. Member 2 is connected to members 3 and 4 so that air passageway 33 is aligned with air passageway 34 in member 3. Air passageway 34 connects to air passageway 35 which terminates at one end of a second piston chamber 37 located in member 3. Air exits passageway 35 and is directed against one end of a biased piston assembly 36 disposed in piston chamber 37, which is sealed at 38, to preclude air from exiting chamber 37.

Piston assembly 36 includes piston cup 39 slidably disposed in second piston chamber 37. Cup 39 is sealed at 40 to preclude fluid or air from exiting the chamber. The cup includes a base 41 and a cylindrical wall 42 depending from the base. Base 41 seats against one end of piston 26 which is slidably disposed in first piston chamber 24.

Spring assembly 50 is employed to bias piston 26 and piston cup 39 toward air passage 35. Assembly 50 comprises a compression spring 51 having one spring end seated in recess 52. Spring cap 53 seats against the remaining end of spring 51. Washer 54 is locked or otherwise fixed to piston 26 by any suitable means and seats against spring cap 53 to retain spring 51 in the normally biased position shown in FIG. 2.

Piston 26 is tapered at its free end 60 and further includes a first recessed area 62 and a second recessed area 61 selectively spaced along the length of piston 26. Recessed piston area 62 surrouns transverse lubricant exit bore 27 whereas recessed area 61 is disposed between end 60 and recessed area 62 so as to offset external forces which sometimes occur when the high pressure lubricant is disposed in first piston chamber 24.

A lubricant nozzle input port 70 leads from piston chamber 24. One end of nozzle member 31 is located adjacent port 70, the nozzle being adapted to be screwed into member 4. Nozzle member 31 includes a first longitudinal bore 71 one end of which is aligned with port 70, while the remaining end terminates into a second, reduced bore 72 located at the outboard end of member 31.

Locking cap 80 is disposed over nozzle member 31 at its outboard end and is screwed into threads 82 in member 2. Cap 80 includes an inner cylindrical wall 83 which is slightly larger in diameter than the diameter of the outer cylindrical wall section 84 of member 31, the difference in diameters being sufficient to provide an air passage between walls 83, 84. Similarly, the diameter of the cylindrical wall section 85 of nozzle member 31 is slightly smaller than the diameter of cylindrical wall section 86 of cap 80 whereby air is permitted to pass between wall sections 85, 86 to form an annular shaped ring about bore 72 whereby air passes through the annular ring and forms around, and, if desired, mixes with lubricant discharged through nozzle bore 72 of exit port 87.

OPERATION

Figure 2:
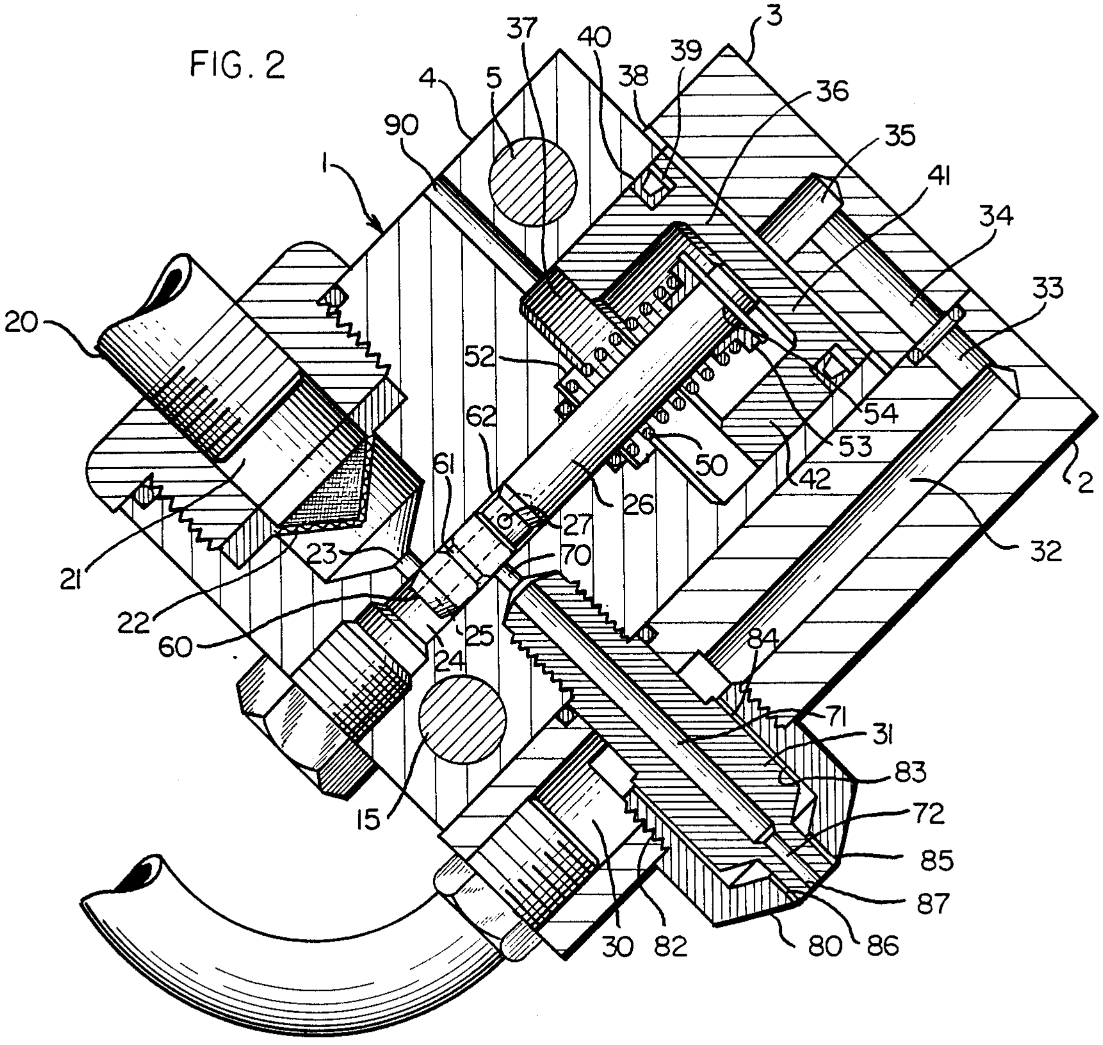
FIG. 2 shows a cross sectional view of the lubricating device of FIG. 1 with the device in an inoperative position.
Figure 3:
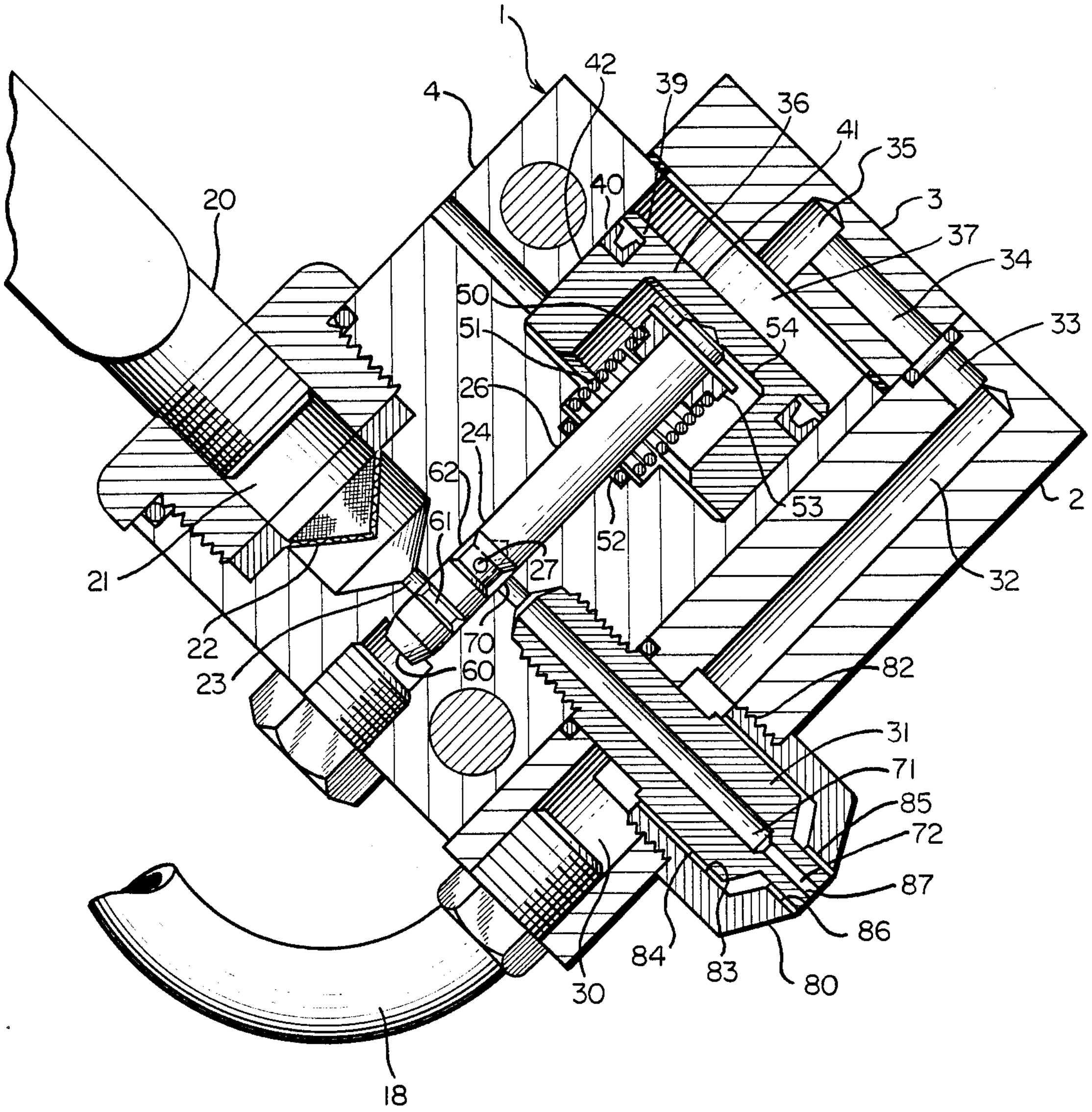
FIG. 3 shows a cross sectional view of the device of FIG. 2 but with the device in an operative position for delivering lubricant to the area to be lubricated.

The operation of the lubricating device is seen in FIGS. 2 and 3. Air enters device 1 from hose 18 and travels two paths. The first path comprises the passage of air from passageway 30 between the cylindrical wall sections 83, 84 and 85, 86 to form an annular ring of air surrounding lubricant exit port 87.

A second path of air travels through air passageway 30, around nozzle member 31 and through passageways 32, 33, 34, and 35. Air in passageway 35 forces biased piston cup 39 downward into chamber 37 thereby compressing spring 50 and forcing residual air in chamber 37 through air vent 90 connected to piston chamber 37.

As seen in FIG. 3, downward movement of cup 39 causes piston 26 to move downward and close lubricant port 23. Piston 26 continues its downward movement until port 23 is aligned with second piston recess area 61 and first piston recess area 62 is aligned with port 70 at which time lubricant will exit out of transverse bore 27 and recess area 62, through port 70 and bores 71 and 72 of nozzle member 31. The lubricant exits member 31 at nozzle exit port 87 and is surrounded by and mixed with the annular ring of air exiting between wall sections 85, 86, whereby the shot of lubricant is directed to the appropriate target to be lubricated such as on a railroad wheel flange.

Subsequent to the shot of lubricant being delivered to the wheel flange, the air supply to the nozzle device 1 is shut off and piston cup 39 and piston 26 return to their normal, inoperative position. The lubricant port 23 will be aligned contiguous to the beveled or tapered end 60 of piston 26 whereby port 23 is open and lubricant enters first chamber 24, axial bore 25 and transverse bore 27 where it remains until the lubricant is discharged in a subsequent lubricating operation.

Activation of the lubricating assembly can be controlled by the setting of the controller disclosed in our pending application Ser. No. 785,571.

What has been found is that with the nozzle device of the present invention, air and lubricant delivered to the lubricating unit at significantly different available pressures can be utilized to provide a desired shot of lubricant to a confined area on a railroad car wheel flange or other target with the air serving to mix with and deliver the desired consistency of lubricant shot.

The foregoing detailed description has been given for clearness of understanding only and no unnecessary limitations should be understood therefrom as modifications will be obvious to those skilled in the art.

We claim:

1. A lubricating device for delivering a shot of lubricant to an area to be lubricated, said device comprising:

a lubricant inlet port;

a first piston assembly means including a first piston chamber and a first movable piston having two ends; said first piston being partially disposed within said chamber and having one end extending outward from said first piston chamber;

means connecting said lubricant inlet port to said first piston assembly for delivering lubricant into said first piston chamber;

a lubricant outlet port;

means connecting said lubricant outlet port to said first piston assembly for delivering lubricant from said first piston chamber to said lubricant outlet port;

said first piston assembly and said first piston comprising a positive means for precluding direct access of lubricant from said lubricant inlet port to said lubricant outlet port;

an air inlet port;

an air outlet port contiguous to said lubricant outlet port;

a first air passage means connecting said air inlet port directly to said air outlet port without said first air passage connecting to said first piston assembly; and, a second piston assembly; a second air passage means connecting said air inlet port to said second piston assembly; a second piston means located in said second piston assembly and contacting one end of said first piston; said second piston means being activated by air from said second air passage for activating said second movable piston means to move said first piston and permit the discharge of lubricant in said first piston assembly to said means connecting said lubricant outlet port to said first piston assembly;

said first piston end contacting said second piston assembly being free of direct contact with said lubricant;

said first movable piston extends into both said first and second piston chambers and further includes a longitudinal bore and a first transverse bore connected to said longitudinal bore for receiving lubricant; and, said first piston further includes;

means disposed thereon for offsetting external forces acting on said piston.

2. A lubricating device for delivering a shot of lubricant to an area to be lubricated on a railroad car wheel or rail, said device comprising:

a lubricant inlet port;

a first piston assembly means including a first piston chamber and a first movable piston having two ends, said piston being partially disposed within said chamber and one of said ends extending outward from said first piston chamber and being free of direct contact with said lubricant;

means connecting said lubricant inlet port to said first piston assembly for delivering lubricant to said first piston chamber;

a lubricant outlet port;

means connecting said lubricant outlet port to said first piston chamber for delivering lubricant from said first piston chamber to said outlet port;

an air inlet port;

an air outlet port contiguous to said lubricant outlet port;

a second piston assembly further including a second piston chamber having a movable piston means disposed therein and adapted to contact one end of said first piston;

said first piston assembly and said first piston further comprising a positive means for precluding direct access of lubricant from said lubricant inlet port to said lubricant outlet port;

a first air passage means connecting said air inlet port to said air outlet port without said first air passage connecting to said first piston assembly;

a second air passage means connecting said air inlet means to said second piston chamber for delivering air to said second piston chamber;

said second piston means being free of direct contact with said lubricant;

said second piston in said second piston chamber is in contact with said first piston in said first piston chamber;

means for permitting one end of said first piston in said first piston chamber to be contacted by said second piston in said second piston chamber;

means for permitting air to travel simultaneously through said first and second air passage means whereby air is delivered to both said air outlet port and said second piston assembly;

said first movable piston in said first piston chamber includes a longitudinal bore for receiving lubricant and a transverse bore connecting to said longitudinal bore;

said second piston in said second piston chamber is a piston cup adapted to seat against one end of said first piston partially disposed in said first piston chamber;

means for biasing said piston cup to normally seat adjacent said second air passage means; and, said first piston includes;

means disposed thereon for offsetting external forces acting on said piston.

3. A lubricating device in accordance with claim 1 or 2 in which said means for offsetting external forces is a recessed area disposed on said first piston.

4. A lubricating device in accordance with claim 3 in which said recessed area is disposed between said transverse bore and said piston end disposed in said first piston chamber.

5. A lubricating device in accordance with claim 2 wherein said device includes a lubricant nozzle inlet port adapted to connect to said recessed area; and, a nozzle member having one end disposed adjacent said lubricant inlet port.

6. A lubricating device in accordance with claim 5 wherein said nozzle member further includes a first lubricant bore connected to said inlet port and a second lubricant bore having a diameter less than the diameter of said first lubricant bore, said second lubricant bore terminating as a nozzle member outlet port.

7. A lubricating device in accordance with claim 6 and further including a locking cap disposed on and having a portion spaced from said nozzle member to form an annular ring means for providing an annular ring of air, said annular ring means being disposed about said nozzle member lubricant exit port.

8. A lubricating device for delivering a shot of lubricant to an area to be lubricated, said device comprising:

a lubricant inlet port;

a first piston assembly means including a first piston chamber and a first movable piston having two ends; said first piston being partially disposed within said chamber and having one end extending outward from said first piston chamber;

a sole means connecting said lubricant inlet port to said first piston assembly for delivering lubricant into said first piston chamber;

a lubricant outlet port;

means connecting said lubricant outlet port to said first piston assembly for delivering lubricant from said first piston chamber to said lubricant outlet port;

said first piston assembly and said first piston comprising a positive means for precluding direct access of lubricant from said lubricant inlet port to said lubricant outlet port;

an air inlet port;

an air outlet port contiguous to said lubricant outlet port;

a first air passage means connecting said air inlet port directly and uninterrupted to said air outlet port without said first air passage connecting to said first piston assembly; and, a second piston assembly; a second air passage means connecting said air inlet port directly and uninterrupted to said second piston assembly; a second piston means located in said second piston assembly and contacting one end of said first piston; said second piston means being activated by air from said second air passage for activating said second movable piston means to move said first piston and permit the discharge of lubricant in said first piston assembly to said means connecting said lubricant outlet port to said first piston assembly; and, said first piston end contacting said second piston assembly being free of direct contact with said lubricant.

9. A lubricating device in accordance with claim 8 and further including means for permitting air to travel simultaneously through said first and second air passage means whereby air is delivered to both said air outlet port and said second piston assembly.

10. A lubricating device in accordance with claim 8 wherein said means connecting said lubricant outlet port to said first piston assembly comprises a nozzle member having a first longitudinal bore and a second reduced longitudinal bore connected to said first nozzle bore and second reduced longitudinal nozzle bore terminating at said lubricant outlet port.

11. A lubricating device in accordance with claim 10 and further including a locking cap removably disposed on said nozzle member and forming a space between said cap and nozzle to provide said first air passage means.

12. A lubricating device in accordance with claim 11 wherein said space formed by said nozzle member and cap is annular shaped and located contiguous to and surrounding said lubricant outlet port.

13. A lubricating device in accordance with claim 8 wherein said first movable piston extends into both said first and second piston chambers and further includes a longitudinal bore and a first transverse bore connected to said longitudinal bore for receiving lubricant.

14. A lubricating device in accordance with claim 13 wherein said second piston assembly further includes:

a second piston chamber;

said second piston means being disposed in said second piston chamber, said second piston means comprising a slidable piston cup disposed in said second chamber;

said piston cup being seated against one end of said movable first piston; and, said second air passage means being connected to said second piston chamber.

15. A lubricating device in accordance with claim 14 and further including means for biasing said piston cup in said second piston assembly to normally seat against said second air passage means.

16. A lubricating device for delivering a shot of lubricant to an area to be lubricated on a railroad car wheel or rail, said device comprising:

a lubricant inlet port;

a first piston assembly means including a first piston chamber and a first movable piston having two ends, said piston being partially disposed within said chamber and one of said ends extending outward from said first piston chamber and being free of direct contact with said lubricant;

a sole means connecting said lubricant inlet port to said first piston assembly for delivering lubricant to said first piston chamber;

a lubricant outlet port;

means connecting said lubricant outlet port to said first piston chamber for delivering lubricant from said first piston chamber to said outlet port;

an air inlet port;

an air outlet port contiguous to said lubricant outlet port;

a second piston assembly further including a second piston chamber having a movable piston means disposed therein and adapted to contact one end of said first piston;

said first piston assembly and said first piston further comprising a positive means for precluding direct access of lubricant from said lubricant inlet port to said lubricant outlet port;

a first air passage means connecting said air inlet port directly and uninterrupted to said air outlet port without said first air passage connecting to said said first piston assembly;

a second air passage means connecting said air inlet means directly and uninterrupted to said second piston chamber for delivering air to said second piston chamber; and, said second piston means being free of direct contact with said lubricant.

17. A lubricating device in accordance with claim 16 and further including means for permitting air to enter said second piston chamber and lubricant to enter said first piston chamber; and, said first piston extends into said first and second piston chamber and contacts said second piston means.

18. A lubricating device in accordance with claim 16 wherein said second piston in said second piston chamber is in contact with said first piston in said first piston chamber.

19. A lubricating device in accordance with claim 18 and further including means for permitting one end of said first piston in said first piston chamber to be contacted by said second piston in said second piston chamber.

20. A lubricating device in accordance with claim 19 and further including means for permitting air to travel simultaneously through said first and second air passage means whereby air is delivered to both said air outlet port and said second piston assembly.

21. A lubricating device in accordance with claim 20 wherein said first movable piston in said first piston chamber includes a longitudinal bore for receiving lubricant and a transverse bore connecting to said longitudinal bore.

22. A lubricating device in accordance with claim 21 wherein said second piston in said second piston chamber is a piston cup adapted to seat against one end of said first piston partially disposed in said first piston chamber.

23. A lubricating device in accordance with claim 22 and further including means for biasing said piston cup to normally seat adjacent said second air passge means.

* * * * *

UNITED STATES PATENT AND TRADEMARK OFFICE

CERTIFICATE OF CORRECTION

PATENT NO. : 4,834,218

DATED : May 30, 1989

INVENTOR(S) : Dombroski, et al.

It is certified that error appears in the above-identified patent and that said Letters Patent is hereby corrected as shown below:

In the "ABSTRACT" section, line 5, change "on" to --one--;

In the "ABSTRACT" section, line 8, change "a direct" to --and direct--;

In col. 2, line 24, change "andis" to --and is--;

In col. 3, line 2, change "Lubriant" to --Lubricant--;

In col. 3, line 43, change "surrouns" to --surrounds--;

In col. 7, line 40, between the words "nozzle" and "to" insert --member--;

In col. 8, line 27, delete one of the "said" words; and

In col. 8, line 67, change "passge" to --passage--.

Signed and Sealed this

Twenty-second Day of May, 1990

*Attest:*

HARRY F. MANBECK, JR.

*Attesting Officer*

*Commissioner of Patents and Trademarks*